United States Patent
Yoon et al.

(10) Patent No.: US 9,041,245 B2
(45) Date of Patent: May 26, 2015

(54) POWER SUPPLY APPARATUS AND METHOD TO CONTROL THE SAME

(75) Inventors: Ho Yoon, Yongin-si (KR); Dae Hyun Lim, Seoul (KR); Joong Ki Moon, Seoul (KR); Sung Wook Kang, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 609 days.

(21) Appl. No.: 13/311,939

(22) Filed: Dec. 6, 2011

(65) Prior Publication Data

US 2012/0139339 A1    Jun. 7, 2012

(30) Foreign Application Priority Data

Dec. 6, 2010 (KR) .................. 10-2010-0123739

(51) Int. Cl.
    *H02J 1/00* (2006.01)
    *H02J 3/00* (2006.01)
    *H02M 1/36* (2007.01)
    *H02H 3/20* (2006.01)
    *H02H 7/12* (2006.01)

(52) U.S. Cl.
    CPC . *H02M 1/36* (2013.01); *H02H 3/20* (2013.01); *H02H 7/12* (2013.01)

(58) Field of Classification Search
    USPC ......... 307/11, 31, 44, 151, 22, 26, 28, 38, 39; 363/49, 20, 21.07; 323/908
    See application file for complete search history.

(56) References Cited

U.S. PATENT DOCUMENTS

| | | | |
|---|---|---|---|
| 3,935,511 A | | 1/1976 | Boulanger et al. |
| 5,737,160 A | * | 4/1998 | Duffy ................ 361/3 |
| 5,995,392 A | * | 11/1999 | Turner ............ 363/49 |
| 8,305,783 B2 | * | 11/2012 | Rizzo ............. 363/53 |
| 8,451,627 B2 | * | 5/2013 | Khan ............. 363/20 |
| 2004/0080961 A1 | * | 4/2004 | Kim et al. ........ 363/21.07 |
| 2004/0090807 A1 | | 5/2004 | Youm |

(Continued)

FOREIGN PATENT DOCUMENTS

| CN | 1387291 A | 12/2002 |
|---|---|---|
| CN | 1645707 A | 7/2005 |

(Continued)

OTHER PUBLICATIONS

Extended European Search Report dated Feb. 3, 2012 issued in corresponding European Patent Application No. 11188929.1.

(Continued)

*Primary Examiner* — Adi Amrany
*Assistant Examiner* — Jagdeep Dhillon
(74) *Attorney, Agent, or Firm* — Staas & Halsey LLP

(57) ABSTRACT

A power supply apparatus includes a converter to convert AC power into DC power, an SMPS to convert the DC power into DC powers desired by loads, a capacitor to interconnect the converter and the SMPS, a PTC element connected to the converter, a first switch connected in parallel with the PTC element, and a second switch connected in series with the first switch. The method includes turning on the second switch to start charging of the capacitor, turning on the first switch to charge the capacitor to a target voltage level, and turning off both the first switch and second switch if a voltage across the capacitor rises over the target voltage level, to discharge the voltage across the capacitor so as to lower the voltage across the capacitor to the target voltage level or lower.

18 Claims, 3 Drawing Sheets

(56) References Cited

U.S. PATENT DOCUMENTS

2009/0129133 A1 5/2009 Khan
2010/0165526 A1* 7/2010 Dishman et al. ............... 361/58

FOREIGN PATENT DOCUMENTS

| | | | |
|---|---|---|---|
| CN | 1945951 A | | 4/2007 |
| GB | 2300982 | | 11/1996 |
| GB | 2300982 A | * | 11/1996 |
| JP | 4-217814 | | 8/1992 |
| JP | 6-245485 | | 9/1994 |
| JP | 10-143259 | | 5/1998 |
| JP | 2007-267473 | | 10/2007 |

OTHER PUBLICATIONS

Chinese Office Action issued Feb. 15, 2015 in corresponding Chinese Application No. 201110412542.6.

* cited by examiner

POWER SUPPLY APPARATUS AND METHOD TO CONTROL THE SAME

CROSS-REFERENCE TO RELATED APPLICATIONS

This application claims the benefit of Korean Patent Application No. 2010-0123739, filed on Dec. 6, 2010 in the Korean Intellectual Property Office, the disclosure of which is incorporated herein by reference.

BACKGROUND

1. Field

Embodiments of the present disclosure relate to a power supply apparatus including a converter, a direct current (DC) capacitor and a switched mode power supply (SMPS), and a method to control the same.

2. Description of the Related Art

Performance of electric devices supplied and operated with alternating current (AC) power varies depending on the quality of the supplied AC power. In this connection, stable power supply is very important in electric devices. In some countries, stable power supply may not be carried out according to regional characteristics, resulting in degradation of electric devices.

For this reason, in a region where the quality of power being supplied is poor, a power stabilizer may be installed and used at a power input side of an electric device. However, this power stabilizer itself applies a considerable impulse voltage to the electric device upon voltage change, resulting in damage to the power input side of the electric device.

Moreover, the use of such a power stabilizer entails additional expenses, thereby increasing the user's economic burden.

SUMMARY

Therefore, it is an aspect of the present disclosure to carry out stable power supply at a minimum cost.

Additional aspects of the disclosure will be set forth in part in the description which follows and, in part, will be apparent from the description, or may be learned by practice of the disclosure.

In accordance with one aspect of the present disclosure, a method to control a power supply apparatus, which includes a converter to convert commercial alternating current (AC) power into direct current (DC) power, a switched mode power supply (SMPS) to convert the DC power into DC powers desired by loads, a capacitor to interconnect the converter and the SMPS, a positive temperature coefficient (PTC) element connected to an input side of the converter, a first switch connected in parallel with the PTC element, and a second switch connected in series with the first switch between the first switch and the converter, includes turning on the second switch to start charging of the capacitor through the PTC element and the second switch, turning on the first switch to charge the capacitor to a target voltage level through the first switch and the second switch, and turning off both the first switch and second switch if a voltage across the capacitor rises over the target voltage level, to discharge the voltage across the capacitor so as to lower the voltage across the capacitor to the target voltage level or lower.

The method may further include turning on the second switch again if the voltage across the capacitor is excessively lowered by the discharging, to charge the capacitor through the PTC element and the second switch.

The first switch and the second switch may be relays.

The first switch may be a normally open relay, and the second switch may be a normally closed relay.

In accordance with another aspect of the present disclosure, a method to control a power supply apparatus, which includes a converter to convert commercial alternating current (AC) power into direct current (DC) power, a switched mode power supply (SMPS) to convert the DC power into DC powers desired by loads, a capacitor to interconnect the converter and the SMPS, a positive temperature coefficient (PTC) element connected to an input side of the converter, a first switch connected in parallel with the PTC element, and a second switch connected in series with the first switch between the first switch and the converter, includes turning on the second switch to charge the capacitor to a third voltage level through the PTC element and the second switch, turning on the first switch if the capacitor is charged to the third voltage level, to charge the capacitor to a target fourth voltage level through the first switch and the second switch, turning off both the first switch and second switch if a voltage across the capacitor rises to a fifth voltage level over the target fourth voltage level, to discharge the voltage across the capacitor so as to lower the voltage across the capacitor to the target fourth voltage level or lower, and turning on the second switch again if the voltage across the capacitor is lowered to a second voltage level lower than the third voltage level, to again charge the capacitor to the third voltage level through the PTC element and the second switch.

The first switch and the second switch may be relays.

The first switch may be a normally open relay, and the second switch may be a normally closed relay.

In accordance with another aspect of the present disclosure, a method to control a power supply apparatus, which includes a converter to convert commercial alternating current (AC) power into direct current (DC) power, a switched mode power supply (SMPS) to convert the DC power into DC powers desired by loads, a capacitor to interconnect the converter and the SMPS, a positive temperature coefficient (PTC) element connected to an input side of the converter, a first switch connected in parallel with the PTC element, and a second switch connected in series with the first switch between the first switch and the converter, includes turning off both the first switch and second switch if a voltage across the capacitor rises over a target voltage level, to discharge the voltage across the capacitor so as to lower the voltage across the capacitor to the target voltage level or lower.

The method may further include turning on the second switch to start charging of the capacitor through the PTC element and the second switch so as to raise the voltage across the capacitor.

The method may further include turning on the first switch after the charging is started, to charge the capacitor to the target voltage level through the first switch and the second switch.

The first switch and the second switch may be relays.

The first switch may be a normally open relay, and the second switch may be a normally closed relay.

In accordance with a further aspect of the present disclosure, a power supply apparatus includes a converter to convert commercial alternating current (AC) power into direct current (DC) power, a switched mode power supply (SMPS) to convert the DC power into DC powers desired by loads, a capacitor to interconnect the converter and the SMPS, a positive temperature coefficient (PTC) element connected to an input side of the converter, a first switch connected in parallel with the PTC element, a second switch connected in series with the first switch between the first switch and the converter, and a controller to turn on the second switch to start charging of the capacitor through the PTC element and the second switch, and, if a voltage across the capacitor rises over a target voltage level, turn off both the first switch and second switch to discharge the voltage across the capacitor so as to lower the voltage across the capacitor to the target voltage level or lower.

The first switch and the second switch may be relays.

The first switch may be a normally open relay, and the second switch may be a normally closed relay.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
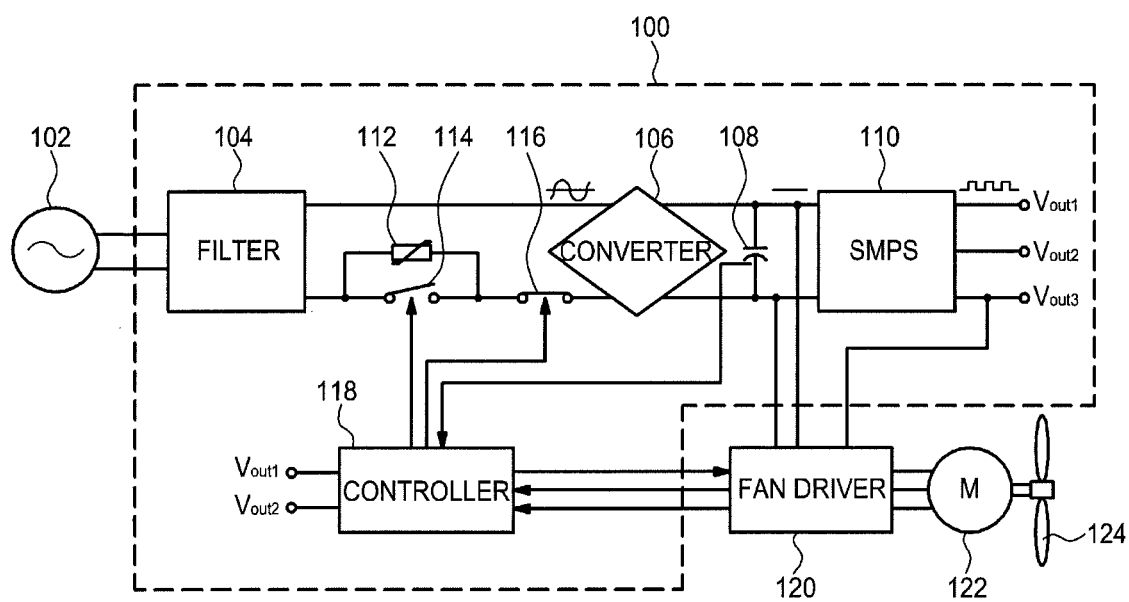
FIG. 1 is a block diagram showing the configuration of a power supply apparatus according to an embodiment of the present disclosure.

Reference will now be made in detail to the embodiments of the present disclosure, examples of which are illustrated in the accompanying drawings, wherein like reference numerals refer to like elements throughout.

FIG. 1 is a block diagram showing the configuration of a power supply apparatus according to an embodiment of the present disclosure. As shown in FIG. 1, the power supply apparatus, denoted by reference numeral 100, is an apparatus that receives commercial AC power and converts the received power into powers having desired characteristics.

A commercial AC power source 102 provides commercial AC power of 220V or 110V. Noise, etc. are removed from the commercial AC power by a filter 104 and the resulting AC power is then input to a converter 106. The converter 106 converts the input AC power into DC power. A capacitor 108 is charged by the converted DC power. This capacitor 108 is a DC capacitor, which may be an electrolytic capacitor. An SMPS 110 receives the DC power charged on the capacitor 108 and converts it into powers having desired characteristics. For example, the SMPS 110 may output converted powers (corresponding to voltages Vout1, Vout2 and Vout3) having electrical characteristics (current levels, voltage levels, etc.) desired by a load side.

A positive temperature coefficient (PTC) element 112, a first switch 114 and a second switch 116 are provided between the commercial AC power source 102 and the converter 106, more particularly at an input side of the converter 106, to control input of power to the converter 106. The first switch 114 is connected in parallel with the PTC element 112, and the second switch 116 is connected in series with the first switch 114 between the first switch 114 and the converter 106. The first switch 114 and the second switch 116 must be switches capable of withstanding considerable power such as commercial AC power, a representative example of which may be relays. Provided that the first switch 114 and the second switch 116 are implemented with relays, a normally open relay must be used as the first switch 114 and a normally closed relay must be used as the second switch 116. These first switch 114 and second switch 116 are on/off-controlled by a controller 118.

The controller 118 detects a voltage across the capacitor 108 (i.e., a voltage charged on the capacitor 108) and on/off-controls the first switch 114 and the second switch 116 according to the level of the charged voltage. For example, when excessively large power is input to the converter 106, the controller 118 may turn off the first switch 114 and the second switch 116 to interrupt the input of the power to the converter 106 and discharge the voltage charged on the capacitor 108, so as to protect the power supply apparatus 100 and loads that are supplied and operated with the above-stated powers from the power supply apparatus 100.

A fan driver 120, a motor 122 and a fan 124 are examples of the loads. The fan driver 120 is supplied and operated with the voltage across the capacitor 108 and the output voltage Vout3 from the SMPS 110. When a fan operation command is generated from the controller 118, the fan driver 120 drives the motor 122 to rotate the fan 124. For reference, the controller 118 is one of the loads of the power supply apparatus, too.

Figure 2:
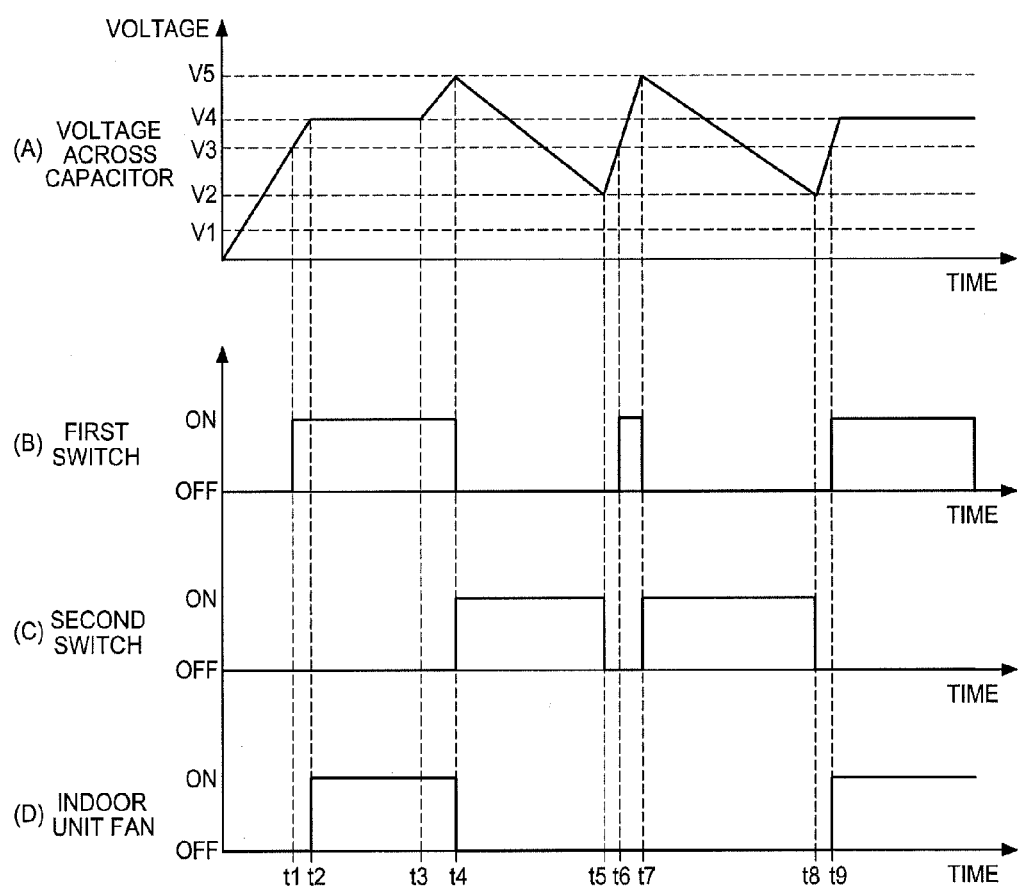
FIG. 2 is a timing diagram illustrating operation characteristics of the power supply apparatus shown in FIG. 1.

FIG. 2 is a timing diagram illustrating operation characteristics of the power supply apparatus shown in FIG. 1. As shown in FIG. 2, if the power supply apparatus is powered on at a time t0, the capacitor 108 is charged and the voltage across the capacitor 108 thus gradually rises. At this time, the first switch 114 implemented with the normally open relay is in an off state and the second switch 116 implemented with the normally closed relay is in an on state. As a result, the charging of the capacitor 108 at this time is performed through the PTC element 112 and the second switch 116 in the on state (t0-t1). Here, the 'off state' is a state in which a circuit is open so that no power is transferred therethrough, and the 'on state' is a state in which a circuit is shorted so that power is transferred therethrough. When the voltage across the capacitor 108 rises to a first voltage level V1, the controller 118 is operated by the output voltages Vout1 and Vout2 from the SMPS 110 to selectively turn the first switch 114 and the second switch 116 on/off as needed.

When the voltage across the capacitor 108 further rises to a third voltage level V3, the controller 118 also turns on the first switch 114 so that the voltage across the capacitor 108 is charged to a target fourth voltage level V4 through the turned-on first switch 114 and second switch 116 (t1-t2). At the time that the voltage across the capacitor 108 reaches the target fourth voltage level V4, the controller 118 operates a load, for example, the fan 124. If the voltage across the capacitor 108 remains at the target fourth voltage level V4, the controller 118 leaves the first switch 114 and the second switch 116 on to maintain stable power supply (t2-t3). However, if the voltage across the capacitor 108 rises over the target fourth voltage level V4 to a fifth voltage level V5, which is an overvoltage level capable of causing problems at the load side, as well as in the power supply apparatus 100 itself (t3-t4), the controller 118 turns off the first switch 114 and the second switch 116 to interrupt the power supply to the converter 106 and discharge the voltage charged on the capacitor 108 (t4-t5). At this time, the rotation of the load, or fan 124, is stopped (t4).

When the voltage across the capacitor 108 is lowered to a second voltage level V2 as it gradually falls through the discharging, the controller 118 turns on the second switch 116 again to charge the capacitor 108. If the voltage across the capacitor 108 rises to the third voltage level V3 through the charging, the controller 118 also turns on the first switch 114 so that the voltage across the capacitor 108 is charged to the target fourth voltage level V4 through the turned-on first switch 114 and second switch 116 (t5-t6).

If the voltage across the capacitor 108 again rises over the target fourth voltage level V4 to the fifth voltage level V5, which is an overvoltage level capable of causing problems at the load side, as well as in the power supply apparatus 100 itself (t6-t7), the controller 118 turns off the first switch 114 and the second switch 116 to interrupt the power supply to the converter 106 and discharge the voltage charged on the capacitor 108 (t7-t8).

When the voltage across the capacitor 108 is lowered to the second voltage level V2 as it gradually falls through the discharging, the controller 118 turns on the second switch 116 again to charge the capacitor 108. If the voltage across the capacitor 108 rises to the third voltage level V3 through the charging, the controller 118 also turns on the first switch 114 so that the voltage across the capacitor 108 is charged to the target fourth voltage level V4 through the turned-on first switch 114 and second switch 116 (t8-t9). At the time that the voltage across the capacitor 108 reaches the target fourth voltage level V4, the controller 118 again operates the load, or fan 124 (t10).

Figure 3:
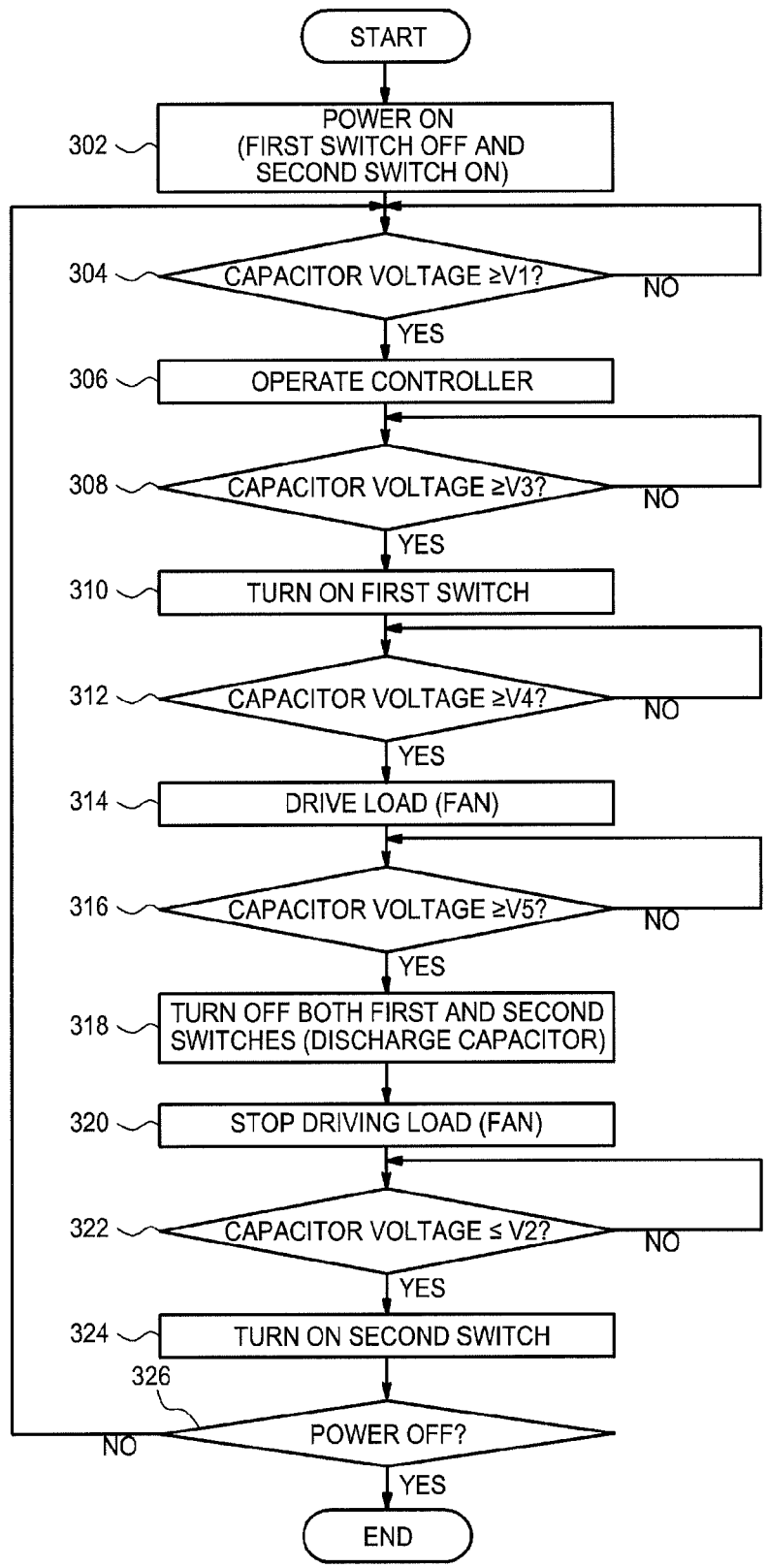
FIG. 3 is a flow chart illustrating a method to control the power supply apparatus shown in FIG. 1.

FIG. 3 is a flow chart illustrating a method to control the power supply apparatus shown in FIG. 1. As shown in FIG. 3, if the power supply apparatus is powered on, charging of the capacitor 108 is performed through the PTC element 112 and the second switch 116 because the first switch 114 implemented with the normally open relay is in an off state and the second switch 116 implemented with the normally closed relay is in an on state (302). Here, the 'off state' is a state in which a circuit is open so that no power is transferred therethrough, and the 'on state' is a state in which a circuit is shorted so that power is transferred therethrough. When the voltage across the capacitor 108 rises to the first voltage level V1 (YES of 304), the controller 118 is operated by the output voltages Vout1 and Vout2 from the SMPS 110 to selectively turn the first switch 114 and the second switch 116 on/off as needed (306).

When the voltage across the capacitor 108 further rises to the third voltage level V3 (YES of 308), the controller 118 also turns on the first switch 114 so that the voltage across the capacitor 108 is charged to the target fourth voltage level V4 through the turned-on first switch 114 and second switch 116 (310). At the time that the voltage across the capacitor 108 reaches the target fourth voltage level V4 (YES of 312), the controller 118 operates the load, or fan 124 (314). If the voltage across the capacitor 108 remains at the target fourth voltage level V4, the controller 118 leaves the first switch 114 and the second switch 116 on to maintain stable power supply. However, if the voltage across the capacitor 108 rises over the target fourth voltage level V4 to the fifth voltage level V5, which is an overvoltage level capable of causing problems at the load side, as well as in the power supply apparatus 100 itself (YES of 316), the controller 118 turns off the first switch 114 and the second switch 116 to interrupt the power supply to the converter 106 and discharge the voltage charged on the capacitor 108 (318). At this time, the rotation of the load, or fan 124, is stopped (320).

When the voltage across the capacitor 108 is lowered to the second voltage level V2 as it gradually falls through the discharging (YES of 322), the controller 118 turns on the second switch 116 again to charge the capacitor 108 (324). If the power supply apparatus is powered off in this state, the operation thereof is ended (YES of 326). Conversely, if the power supply apparatus is kept powered on, the method returns to the control operation of the controller 118 of block 306 to repeat the above operations 306 to 326.

As is apparent from the above description, according to an aspect of the present disclosure, it may be possible to carry out stable power supply at a minimum cost.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A method to control a power supply apparatus, the apparatus including a converter to convert commercial alternating current (AC) power into direct current (DC) power, a switched mode power supply (SMPS) to convert the DC power into DC powers desired by loads, a capacitor to interconnect the converter and the SMPS, a positive temperature coefficient (PTC) element connected to an input side of the converter, a first switch connected in parallel with the PTC element, and a second switch connected in series with the first switch between the first switch and the converter, the method comprising:
   turning on the second switch to start charging of the capacitor through the PTC element and the second switch;
   turning on the first switch to charge the capacitor to a target voltage level through the first switch and the second switch; and
   turning off both the first switch and second switch if a voltage across the capacitor rises over the target voltage level, to discharge the voltage across the capacitor so as to lower the voltage across the capacitor to the target voltage level or lower,
   wherein the first switch and second switch provide complete control of the AC power to the converter.

2. The method according to claim 1, further comprising turning on the second switch again if the voltage across the capacitor is excessively lowered by the discharging, to charge the capacitor through the PTC element and the second switch.

3. The method according to claim 1, wherein the first switch and the second switch are relays.

4. The method according to claim 3, wherein:
   the first switch is a normally open relay; and
   the second switch is a normally closed relay.

5. A method to control a power supply apparatus, the apparatus including a converter to convert commercial alternating current (AC) power into direct current (DC) power, a switched mode power supply (SMPS) to convert the DC power into DC powers desired by loads, a capacitor to interconnect the converter and the SMPS, a positive temperature coefficient (PTC) element connected to an input side of the converter, a first switch connected in parallel with the PTC element, and a second switch connected in series with the first switch between the first switch and the converter, the method comprising:
   turning on the second switch to charge the capacitor to a third voltage level through the PTC element and the second switch;
   turning on the first switch if the capacitor is charged to the third voltage level, to charge the capacitor to a target fourth voltage level through the first switch and the second switch;
   turning off both the first switch and second switch if a voltage across the capacitor rises to a fifth voltage level over the target fourth voltage level, to discharge the voltage across the capacitor so as to lower the voltage across the capacitor to the target fourth voltage level or lower; and
   turning on the second switch again if the voltage across the capacitor is lowered to a second voltage level lower than the third voltage level, to again charge the capacitor to the third voltage level through the PTC element and the second switch, wherein the first switch and second switch provide complete control of the AC power to the converter.

6. The method according to claim 5, wherein the first switch and the second switch are relays.

7. The method according to claim 6, wherein:
the first switch is a normally open relay; and
the second switch is a normally closed relay.

8. A method to control a power supply apparatus, the apparatus including a converter to convert commercial alternating current (AC) power into direct current (DC) power, a switched mode power supply (SMPS) to convert the DC power into DC powers desired by loads, a capacitor to interconnect the converter and the SMPS, a positive temperature coefficient (PTC) element connected to an input side of the converter, a first switch connected in parallel with the PTC element, and a second switch connected in series with the first switch between the first switch and the converter, the method comprising:

turning off both the first switch and second switch if a voltage across the capacitor rises over a target voltage level, to discharge the voltage across the capacitor so as to lower the voltage across the capacitor to the target voltage level or lower, wherein the first switch and second switch provide complete control of the AC power to the converter.

9. The method according to claim 8, further comprising turning on the second switch to start charging of the capacitor through the PTC element and the second switch so as to raise the voltage across the capacitor.

10. The method according to claim 9, further comprising turning on the first switch after the charging is started, to charge the capacitor to the target voltage level through the first switch and the second switch.

11. The method according to claim 8, wherein the first switch and the second switch are relays.

12. The method according to claim 11, wherein:
the first switch is a normally open relay; and
the second switch is a normally closed relay.

13. A power supply apparatus comprising:
a converter to convert commercial alternating current (AC) power into direct current (DC) power;
a switched mode power supply (SMPS) to convert the DC power into DC powers desired by loads;
a capacitor to interconnect the converter and the SMPS;
a positive temperature coefficient (PTC) element connected to an input side of the converter;
a first switch connected in parallel with the PTC element;
a second switch connected in series with the first switch between the first switch and the converter; and
a controller to turn on the second switch to start charging of the capacitor through the PTC element and the second switch, and, if a voltage across the capacitor rises over a target voltage level, turn off both the first switch and second switch to discharge the voltage across the capacitor so as to lower the voltage across the capacitor to the target voltage level or lower, wherein the first switch and second switch provide complete control of the AC power to the converter.

14. The power supply apparatus according to claim 13, wherein the first switch and the second switch are relays.

15. The power supply apparatus according to claim 14, wherein:
the first switch is a normally open relay; and
the second switch is a normally closed relay.

16. The power supply apparatus according to claim 13, wherein the first switch and the second switch are adapted to withstand commercial AC power of 110V or 220V.

17. The power supply apparatus according to claim 13, further comprising a filter to remove noise from the commercial AC power, the resulting AC power being then input to the converter.

18. The power supply apparatus according to claim 13, wherein the capacitor comprises an electrolytic capacitor.

* * * * *